United States Patent [19]

Ni

[11] Patent Number: 5,157,237

[45] Date of Patent: Oct. 20, 1992

[54] WELDING ELECTRODE WIRE HAVING MULTIPLE CURRENT CONTACTS AND DISPENSING APPARATUS THEREFOR AND METHOD OF MAKING SAME

[76] Inventor: Jian M. Ni, 3050 Ellesmere Road, Suite 1610, Scarborough, Ontario, Canada, M1E 5E6

[21] Appl. No.: 838,586

[22] Filed: Feb. 18, 1992

[51] Int. Cl.⁵ ............................................... B23K 35/02
[52] U.S. Cl. ................................ 219/137.2; 219/136; 219/145.23
[58] Field of Search ............... 219/137.2, 136, 145.23, 219/145.31

[56] References Cited

FOREIGN PATENT DOCUMENTS 749439  7/1933  France ........................ 219/137.2
1159737 6/1985  U.S.S.R. ...................... 219/137.2

Primary Examiner—Clifford C. Shaw
Attorney, Agent, or Firm—David W. Wong

[57] ABSTRACT

An elongated welding electrode wound on a dispensing spool and having a plurality of welding current conduction terminals is shown. The electrode has a plurality of transverse grooves formed therein and the grooves are filled with a soft metal substance to form conductive strips. The top plate of the spool has a plurality of arms covering over the conductive strips and has conductive terminals therein contacting the conductive strips in the electrode for supplying the welding current in maximum efficiency to the electrode in the welding operation.

12 Claims, 1 Drawing Sheet

WELDING ELECTRODE WIRE HAVING MULTIPLE CURRENT CONTACTS AND DISPENSING APPARATUS THEREFOR AND METHOD OF MAKING SAME

BACKGROUND OF THE INVENTION

This invention relates to welding electrodes and particularly relates to a welding electrode wound on a dispensing spool having a plurality of current conducting terminals for supplying a maximum welding current to the electrode for the purposes of welding, and the method of making such electrode.

A welding electrode wire consists of an elongated metal wire core having a welding flux coating provided on its outside surface. The flux coating is made of a relatively flexible compound so that the electrode wire can be wound on a spool for dispensing during use. In the welding process, a high current must be passed through the electrode wire and the work piece in order to provide the required energy for fusing the metal of the metal wire core to the work piece. Since the flux is made of a electrically non-conductive or highly resistive material, it has been problematic in providing the high current efficiently from one end of the inner end of the electrode through its entire length to the free end therein in the welding operation. Due to the relatively long length of metal wire core, the supply current must pass through, a considerable amount of the supply current is inherently lost through leakage and the intrinsic resistance in the metal wire core. Therefore, the current from the supply is not efficiently utilized resulting often in the formation of unsatisfactory welds.

In order to obviate the above problem, one attempt has been made by providing a longitudinal groove in the flux coating extending over the entire length of the electrode wire. The longitudinal groove exposes the metal wire core such that the welding current can be directly supplied to the metal core at any selected point and as close to the free end of the electrode as possible so as to provide the needed high current for forming a satisfactory weld. However, the main drawback of such a construction is that since the flux coating is not uniformly provided over the circumferential surface of the metal wire core due to the existence of the longitudinal groove, in the welding operation the flux is not uniformly provided to the welding pool resulting in the formation of a weak weld. Moreover, the flux coating tends to scatter away from the metal wire core in use when heat is generated at the metal wire core. Thus, insufficient flux is being provided to the weld. This is due to that the elongated longitudinal groove has weaken the cohesion of the flux material coated on the metal wire core.

SUMMARY OF THE INVENTION

It is a principal object of the present invention to provide an elongated flexible welding electrode wire having selected current contacts so that the welding current can be efficiently supplied to the metal wire core therein.

It is another object of the present invention to provide an elongated electrode wire having a substantially uniform welding flux coating.

It is another object of the present invention to provide a welding electrode which is simple to fabricate and easily to dispense with a spool having a relatively simple structure.

It is yet another object of the present invention to provide a welding electrode which is operative to provide a strong weld.

The welding electrode can be wound on a hub portion of a dispensing spool. The electrode comprises an elongated welding metal wire core covered with a welding flux coating. A selected number of grooves are formed in the electrode top surface. These grooves extend radially outwards from the hub portion of the spool and transversely across the longitudinal axis of the electrode. The grooves have a depth just reaching the metal wire core so as to expose the surface of the metal wire core within the grooves. A soft metal substance is placed in the grooves to form conductive strips therein. A top plate is secured to the spool. The top plate has a plurality of arms covering over the conductive strips and electrically terminal means are provided at these arms such that the welding current can be supplied to the metal wire core of the welding electrode through all the conductive strips.

BRIEF DESCRIPTION OF THE DRAWINGS

Other objects of this invention will appear in the following description and appended claims, reference being made to the accompanying drawings forming a part of the specification, in which

DETAIL DESCRIPTION OF THE PREFERRED EMBODIMENTS

Figure 1:
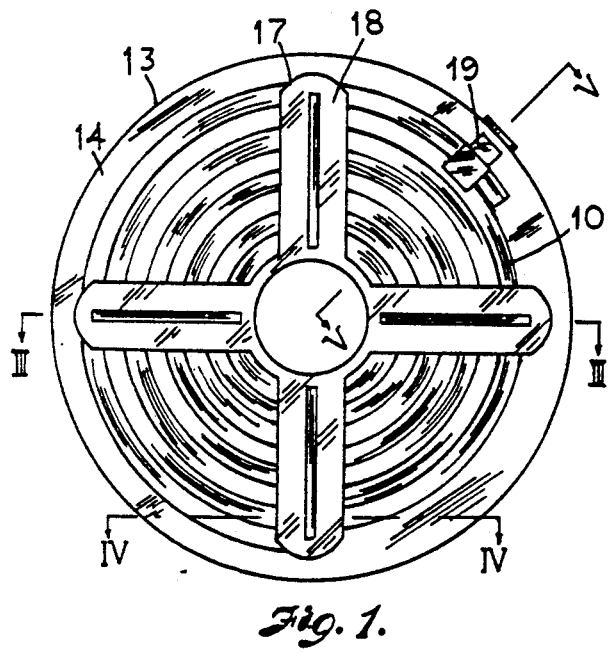
FIG. 1 is a top elevation view of the elongated welding electrode wire wound on a dispensing spool according to the present invention.
Figure 5:
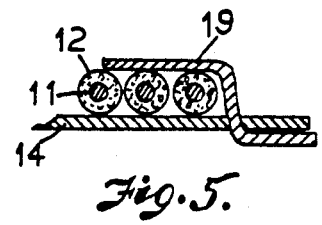
FIG. 5 is a partial cross section side elevation view along section line V—V in FIG. 1.
Figure 4:
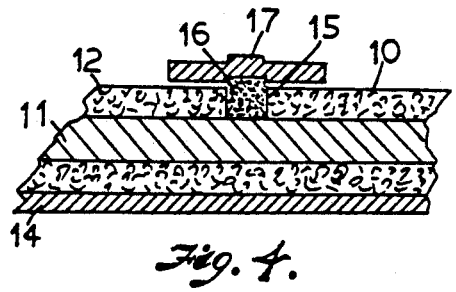
FIG. 4 is a partial cross section side elevation view along section line IV—IV in FIG. 1.
Figure 3:
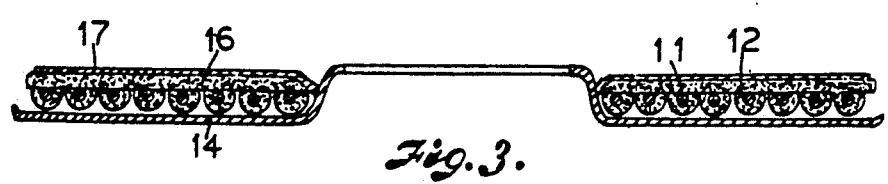
FIG. 3 is a cross section side elevation view along section line III—III in FIG. 1.

With reference to the drawings in which like reference numerals designate like parts in the several views, the welding electrode wire 10 according to the present invention consists of an elongated metal wire core 11 coated with a flexible welding flux material 12 over the surface of its entire length. Such electrode wire typically may have a length of about five meters long. The electrode wire 10 is then wound on a dispensing spool 13 which has a base plate 14 with a circular hub. At least one row of groove and preferably a plurality of rows of grooves 15 are formed on the top surface portion of the wound electrode wire 10. Generally, the smaller the diameter of the electrode wire 10 the more rows of grooves 15 are desirous in order to provide more efficient current conduction to the metal wire core 11. Four transverse rows of grooves 15 are formed in the exemplary embodiment shown herein. The grooves 15 are formed by removing only the arcuate top portion of the flux coating 12 across the electrode wire 10, so that they have a depth extending just to the surface of the metal wire core 11 to expose the surface of the latter as best shown in FIGS. 3 and 4. The grooves 15 has a relatively narrow width which is less than the diameter of the electrode wire 10. Typically, the width of the grooves 15 is about 1 millimeter to 2 millimeters. An electrically conductive substance is placed into the grooves 15 to form electrically conductive strips 16. The substance is preferably made of a soft metal substance such as aluminum powder mixed with a carrier compound. The conductive strips 16 has a height slightly higher than the depth of the grooves 15 such that they extend slightly above the top surface of the electrode wire 10. The reason for such a provision will become apparent from the description below. A top plate 17 is mounted onto the spool 13. The top plate 17 may be made by stamping it out from the bottom plate 14 of the spool 13. The spool 13 may be conveniently made with a sheet metal. The top plate 17 may have a cross shape as shown in FIG. 1 such that when mounted onto the hub of spool 13, the radial arms 18 of the top plate 17 are in registration with the grooves 15 formed on the electrode wire 10 to cover thereover. The radial arms 18 will press tightly downwards upon the conductive strips 16 as best shown in FIG. 4 to provide a contact means for supplying the welding current to the metal wire core 11 of the welding electrode wire 10. If the spool 13 is made of an electrically non-conductive material such as plastics, a metal bar member may be mounted to the radial arms 18 to provide the contact terminals of the conductive strips 16 for supplying the welding current to the metal wire core 11.

Figure 6:
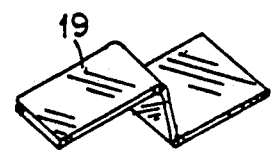
FIG. 6 is a perspective side elevation view of a slidable retaining clip for the electrode wire wound on the spool according to the present invention.
Figure 2:
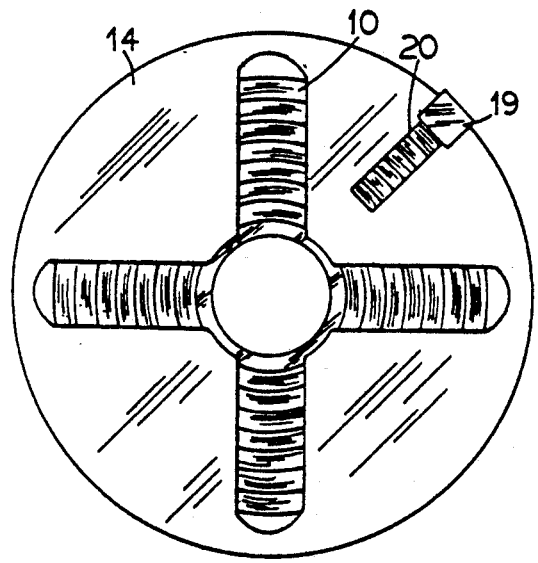
FIG. 2 is a bottom elevation view thereof.

At least one slidable retaining clip 19 is provided at the bottom plate 14 of the spool 13 in order to retain the free end of the electrode wire 10 mounted in place on the spool 13. The retaining clip 19 is a double L-shaped member as shown in FIG. 6 which can be slidable along a radial slot 20 formed in the bottom plate 14 of the spool 13.

In use, the dispensing spool 13 is directly mounted to the welding fixture in which the welding current is fed to the metal wire core 11 and the work piece through the arms 18 in the top plate 17. The welding current is passed to the metal wire core 11 through the plurality of contact points formed by the soft metal strips 16. Thus, virtually no loss of the welding current is present, and all the welding current from the power supply is efficiently used solely for the welding process to provide a strong weld.

Since the soft metal strips 16 extend slightly above the top of the grooves 15. The strips 16 prevent the radial arms 18 from damaging the flux coating 12 by scraping against the latter when the electrode wire 10 being dispensed from the spool 13. Furthermore, since the grooves 15 are formed only on the top arcuate portion of the flux coating 12 and have a relatively negligible width, they do not present any deleterious effect to the formation of the weld as in the common electrode wire having a longitudinal groove in the flux coating.

While I have illustrated in the drawings and description above specific methods and apparatus constituting preferred embodiments of the invention, it will be appreciated that various modifications may be made in the form of the apparatus and construction, and that equivalent methods, elements and mechanisms may be substituted therefor without departing from the scope of the invention. All such changes, including reversals of parts and the use of certain features of the invention independently of other features, all fall within the spirit and scope of the invention as defined in the appended claims.

I claim:

1. A method of forming an elongated welding electrode wire having a high conductivity of the welding current, said electrode wire having a welding metal wire core with external surfaces covered with an electrically resistive welding flux coating, comprising
   mounting said electrode wire on a spool member, said spool member having a bottom plate means and a central hub means,
   forming at least one row of groove in an arcuate top portion said electrode wire, said groove extending radially outwards from said central hub means of said spool member and being transverse to the longitudinal axis of said electrode wire whereby exposing a surface portion of said metal wire core within said groove,
   filling said row of groove with an electrically conductive soft metal substance to form a conductive strip member therein,
   mounting a top plate member on said spool member, said top plate having a radial arm in registry with said conductive strip member to provide a terminal means operative for passing the welding current to said electrode wire.

2. A method of forming an elongated welding electrode wire according to claim 1 including forming a plurality of rows of grooves on electrode wire, said rows of grooves being evenly formed over the entire top surface of said electrode wire coiled upon said spool member.

3. A method according to claim 2 wherein said soft metal conductive strip member is made of a mixture of aluminum powder and an electrically conductive carrier substance.

4. A method according to claim 3 wherein said grooves have a width substantially smaller than the diameter of said electrode wire.

5. In an welding electrode wire dispensing spool having an elongated electrode wire wound on a hub portion therein, said electrode wire comprising,
   an elongated metal wire core member covered with a welding flux coating,
   a plurality of rows of grooves formed in said electrode wire, said grooves extending radially outwards from said hub portion and being transverse to the longitudinal axis of said electrode wire and extending downwardly from said flux coating to said metal wire core member,
   electrically conductive strip means disposed in said grooves, said strip means having a height larger than the depth of said grooves,
   top plate means mounted on said spool, said top plate means having radial arm members extending over said strip means and being in electrical contact therewith and being operative to supply welding current to said metal wire core member through said strip means.

6. In a welding electrode wire dispensing device according to claim 5 wherein said strip member is made of an electrically conductive soft metal substance.

7. In a welding electrode wire dispensing device according to claim 6 wherein said soft metal substance is a mixture of aluminum and a flexible carrier substance.

8. In a welding electrode wire dispensing device according to claim 7 including a retaining clip means slidably mounted on said spool and being operative to retain said electrode wire securely mounted on said spool.

9. In a welding electrode wire dispensing device according to claim 8 wherein said retaining clip means has a double L-shape and is slidably mounted on a radial slot form in said spool.

10. In a welding electrode wire dispensing device according to claim 9 wherein said top plate means is made of an electrically conductive metal sheet material.

11. In a welding electrode wire dispensing device according to claim 10 wherein said spool and said top plate means are made of a plastic material.

12. In a welding electrode wire dispensing device according to claim 11 including electrically conductive bar means disposed on said radial arm members, said bar means being in electrical contact with said strip means.

* * * * *